(12) United States Patent
Yang et al.

(10) Patent No.: US 7,500,022 B2
(45) Date of Patent: *Mar. 3, 2009

(54) COMPUTER SYSTEM WITH BUILT-IN MULTIMEDIA SYSTEM WHERE MULTIMEDIA SYSTEM IS OPERABLE INDEPENDENT OF THE OPERATING SYSTEM OF THE COMPUTER SYSTEM AND WHERE COMPUTER SYSTEM IS CAPABLE OF OUTPUTTING VIDEO

(75) Inventors: Chun-Chang Yang, Taipei Hsien (TW); Hung-Te Yu, Taipei Hsien (TW)

(73) Assignee: Mirco-Star Int'l Co., Ltd., Taipei Hsien (TW)

( * ) Notice: Subject to any disclaimer, the term of this patent is extended or adjusted under 35 U.S.C. 154(b) by 318 days.

This patent is subject to a terminal disclaimer.

(21) Appl. No.: 11/160,517

(22) Filed: Jun. 28, 2005

(65) Prior Publication Data

US 2006/0294268 A1    Dec. 28, 2006

(51) Int. Cl.
*G06F 3/00* (2006.01)
(52) U.S. Cl. ......................................................... 710/5
(58) Field of Classification Search ................... 710/5
See application file for complete search history.

(56) References Cited

U.S. PATENT DOCUMENTS

| | | | | |
|---|---|---|---|---|
| 5,189,543 A | * | 2/1993 | Lin et al. | 398/106 |
| 5,461,266 A | * | 10/1995 | Koreeda et al. | 307/125 |
| 6,006,285 A | | 12/1999 | Jacobs et al. | |
| 6,266,714 B1 | | 7/2001 | Jacobs et al. | |
| 6,279,056 B1 | | 8/2001 | Jacobs et al. | |
| 6,557,170 B1 | * | 4/2003 | Wilder et al. | 725/130 |
| 6,765,788 B2 | * | 7/2004 | Wu | 361/680 |

(Continued)

FOREIGN PATENT DOCUMENTS

DE    103 53 071 A1    6/2005

(Continued)

OTHER PUBLICATIONS

Dell Inspiron 8200: Owner's Manual, Sep. 2002, Dell, Rev. A03, pp. 20, 22, 24, 30, 33, 47, 53, 54, 64, 107, 112, 114.*

(Continued)

*Primary Examiner*—Henry W. H. Tsai
*Assistant Examiner*—Hyun Nam
(74) *Attorney, Agent, or Firm*—Winston Hsu

(57) ABSTRACT

A computer system includes a display device, a video output interface, and a control module. The control module includes a central processing unit, a multimedia processing unit, and an output switch circuit. When the computer system is powered off and a multimedia mode is entered, the multimedia processing unit is capable of processing signals from a multimedia source of a storage medium. The output switch circuit includes inputs X1 and X2 respectively coupled to the central processing unit and the multimedia processing unit, and outputs Y1 and Y2 respectively coupled to the display device and the video output interface. The input X1 or X2 of the output switch circuit is selected to receive the signals from the central processing unit or from the multimedia processing unit, and the output Y1 or Y2 is selected to output the signals to the display device or to the video output interface.

7 Claims, 2 Drawing Sheets

U.S. PATENT DOCUMENTS

2003/0179659 A1* 9/2003 Shi et al. ................. 369/19
2003/0223736 A1* 12/2003 Muzaffer et al. ............ 386/125
2005/0196154 A1* 9/2005 Chiang et al. ............... 386/125

FOREIGN PATENT DOCUMENTS

DE    10 2005 055 645 A1    8/2006
GB         2 406 405 A      3/2005
TW         226609 B          1/2005

OTHER PUBLICATIONS

InterVideo-Linux makes PC a Hifi device[online], Jan. 15, 2004, Internet URL: http://www.golem.de/0401/29295.html.
U.S. Appl. No. 11/096,332, filed Jun. 28, 2005, Micro-Star Int'l Co., Ltd.

* cited by examiner

COMPUTER SYSTEM WITH BUILT-IN MULTIMEDIA SYSTEM WHERE MULTIMEDIA SYSTEM IS OPERABLE INDEPENDENT OF THE OPERATING SYSTEM OF THE COMPUTER SYSTEM AND WHERE COMPUTER SYSTEM IS CAPABLE OF OUTPUTTING VIDEO

BACKGROUND OF THE INVENTION

1. Field of the Invention

The present invention relates to a computer system, and more particularly, to a computer system capable of playing video when the computer is powered off.

2. Description of the Prior Art

Since electronics technology has progressed, electronic devices, such as personal computers, notebook computers, and personal data assistants, have become available to everyone. In addition to data management, such devices also allow access to the Internet and can serve audio and video entertainment, adding more fun to a busy life.

For audio and video entertainment, CD-ROM, DVD-ROM, or CD-RW implemented in a computer system are commonly used for playing video multimedia, such as VCDs and DVDs. After the operating system of the computer is loaded, a user can enjoy the video and audio via the display and the speaker of the computer. However, the power supply of the computer system only provides power to the optical disk drive after the computer system is booted, and only then the optical disk drive is capable of being operated. If the computer system is powered off, the optical disk drive does not work. Therefore, the computer system must be powered on before playing video multimedia. The lengthy duration of the booting process for the operating system renders playing video multimedia undesirable.

Regarding an optical disk drive capable of being operated when the computer is powered off, there are related teachings in U.S. Pat. No. 6,279,056, No. 6,266,714, and No. 6,006,285. These patents disclose computer systems capable of playing audio CDs in a CD-ROM drive independent of the operating system by switching into an audio CD mode. The computer systems disclosed in these patents are capable of playing audio CDs by using an interrupt signal for system management or by using the playing function of the CD-ROM drive when the operating system, the CD-ROM drive software, and application programs are not completely loaded.

FIG. 1 shows a computer system 1 capable of playing video multimedia when the computer is powered off, disclosed in U.S. patent application Ser. No. 11/096,332. The computer system 1 can play data in a multimedia source 3 of a storage medium via a display 2, and can be a personal computer, a notebook computer, or other electronic device having an access device 12 capable of accessing the multimedia source 3. In addition to the access device 12 mentioned above, the computer system 1 further comprises a power supply 11, a switch circuit 13, a host 14, a multimedia processing unit 15, and a display control unit 16.

The power supply 11 provides power to the access device 12, the switch circuit 13, the host 14, and the multimedia processing unit 15. The access device 12 can access the multimedia source 3 of the storage medium and generate a data signal 101 to the switch circuit 13. The switch circuit 13 is used for switching to a computer mode or a multimedia mode in the computer system 1. The host 14 executes common computer functions, and outputs a host signal 102 to the display control unit 16. The display 2, electrically connected to the display control unit 16, is used for displaying images of the computer.

When switching to the computer mode, the access device 12 can be electrically connected to the host 14 via the switch circuit 13, so that the host 14 can receive the data signal 101 from the switch circuit 13 and output the host signal 102 to the display control unit 16. Then, the display control unit 16 outputs the host signal 102 to the display 2 for showing images related to the operating system or other programs (i.e. windows or screens).

When switching to the multimedia mode, the access device 12 can be electrically connected to the multimedia processing unit 15 via the switch circuit 13, so that the multimedia processing unit 15 can process the data signal 101 from the switch circuit 13 to generate a multimedia signal 103 inputted into the display control unit 16. Then the display control unit 16 scales the multimedia signal 103 according to the size of the display 2 for displaying the multimedia signal 103. Therefore, although the host 14 is not powered on, the data of the multimedia source 3 of the storage media can be read by the access device 12, and processed and displayed by the multimedia processing unit 15.

Whether the display control unit 16 receives the host signal 102 output from the host 14 in the computer mode or receives the multimedia signal 103 output from the multimedia processing unit 15 in the multimedia mode, the display control unit 16 must distinguish video signals for the computer mode or the multimedia mode so as to scale video signals for the display 2. Therefore, the design of this prior art system becomes more complex.

SUMMARY OF THE INVENTION

It is therefore a primary objective of the claimed invention to provide a computer system capable of outputting video signals formatted for a display device without mode identification of a computer mode or a multimedia mode to solve the above-mentioned problem.

The claimed invention also provides a computer system capable of receiving video signals formatted for a computer mode or a multimedia mode, the video signals being output to an external display device via a video output interface embedded in the computer system.

The computer system of the claimed invention is used for playing a multimedia source of a storage medium. The computer system comprises a display device, a video output interface, and a control module. The video output interface is used for transmitting video signals of the multimedia source to an external display for playing video. The control module is electrically connected to the display device and the video output interface.

The control module comprises a central processing unit, a multimedia processing unit, and an output switch circuit. When the computer is powered on, the central processing unit enters the computer mode to access the multimedia source of the storage medium and outputs a host signal formatted for the display device. When the computer is powered off, the multimedia processing unit enters the multimedia mode, and transforms the multimedia source of the storage medium into a multimedia signal conforming to the format of the display device.

The output switch circuit is electrically connected to the central processing unit, the multimedia processing unit, and the display device. The output switch circuit comprises inputs X1 and X2 respectively coupled to the central processing unit and the multimedia processing unit, and outputs Y1 and Y2 respectively coupled to the display device and the video output interface.

Therefore, the claimed invention can select the input X1 or X2 of the output switch circuit to receive signals from the central processing unit or from the multimedia processing unit respectively, and can select the output Y1 or Y2 to output video signals to the display device or to the video output interface respectively.

Before the host signal generated by the central processing unit and the multimedia signal generated by the multimedia processing unit are transmitted to the output switch circuit, all signals are transformed to the format for the display device or for the video output interface. Therefore, the output switch circuit just outputs signals to the display device or to the video output interface for playing video. The claimed invention need not have a display control unit to distinguish video signals for the computer mode or the multimedia mode. The claimed invention not only simplifies the design of the system, but also provides a function for outputting video signals to the external display device via the video output interface.

These and other objectives of the present invention will no doubt become obvious to those of ordinary skill in the art after reading the following detailed description of the preferred embodiment that is illustrated in the various figures and drawings.

DETAILED DESCRIPTION

Regarding the above description and detailed technology of the present invention, a best embodiment with drawings are disclosed as follows.

Figure 1:
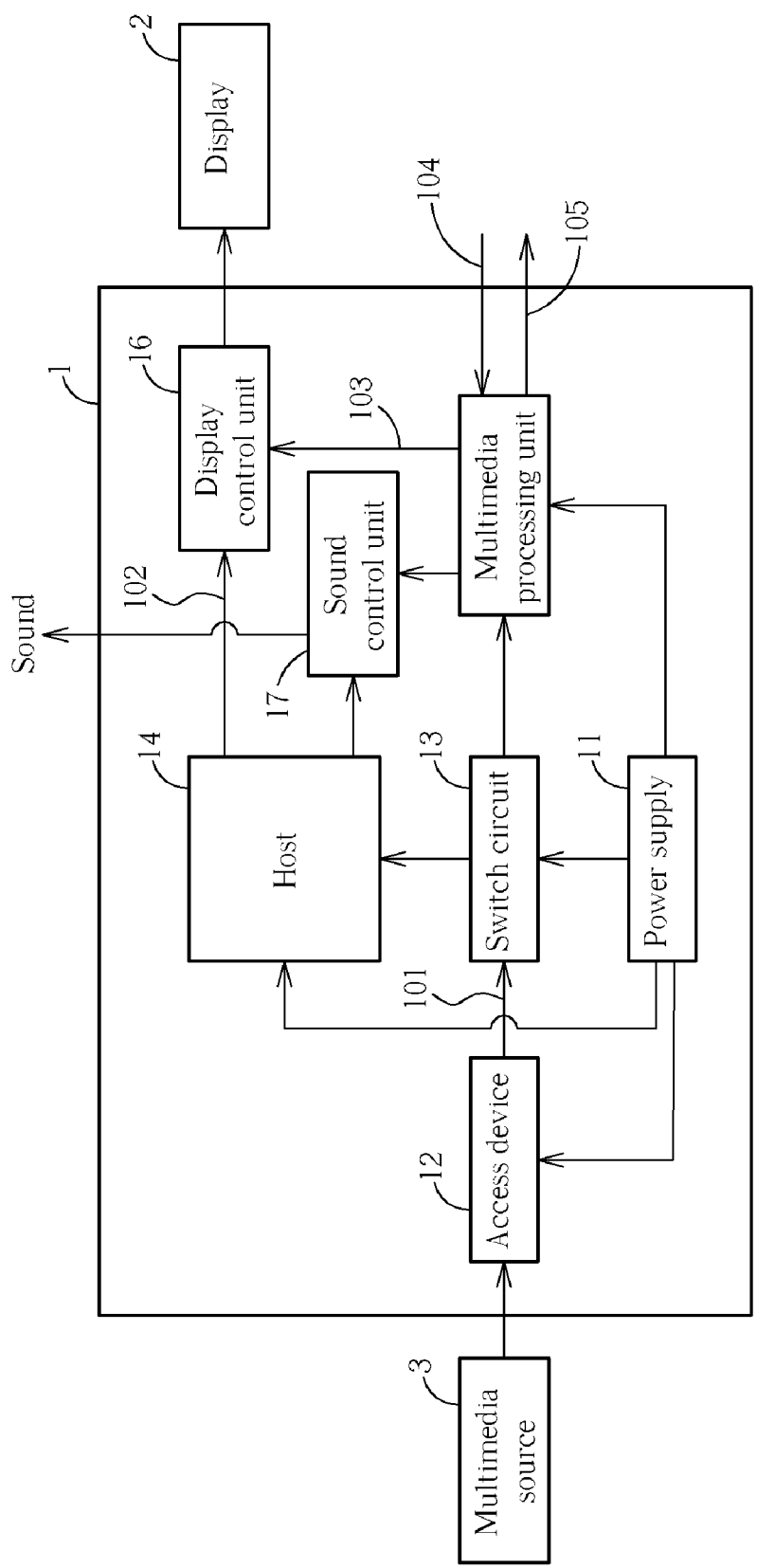
FIG. 1 is a block diagram of a computer system capable of displaying multimedia when the computer is not powered on according to the prior art.
Figure 2:
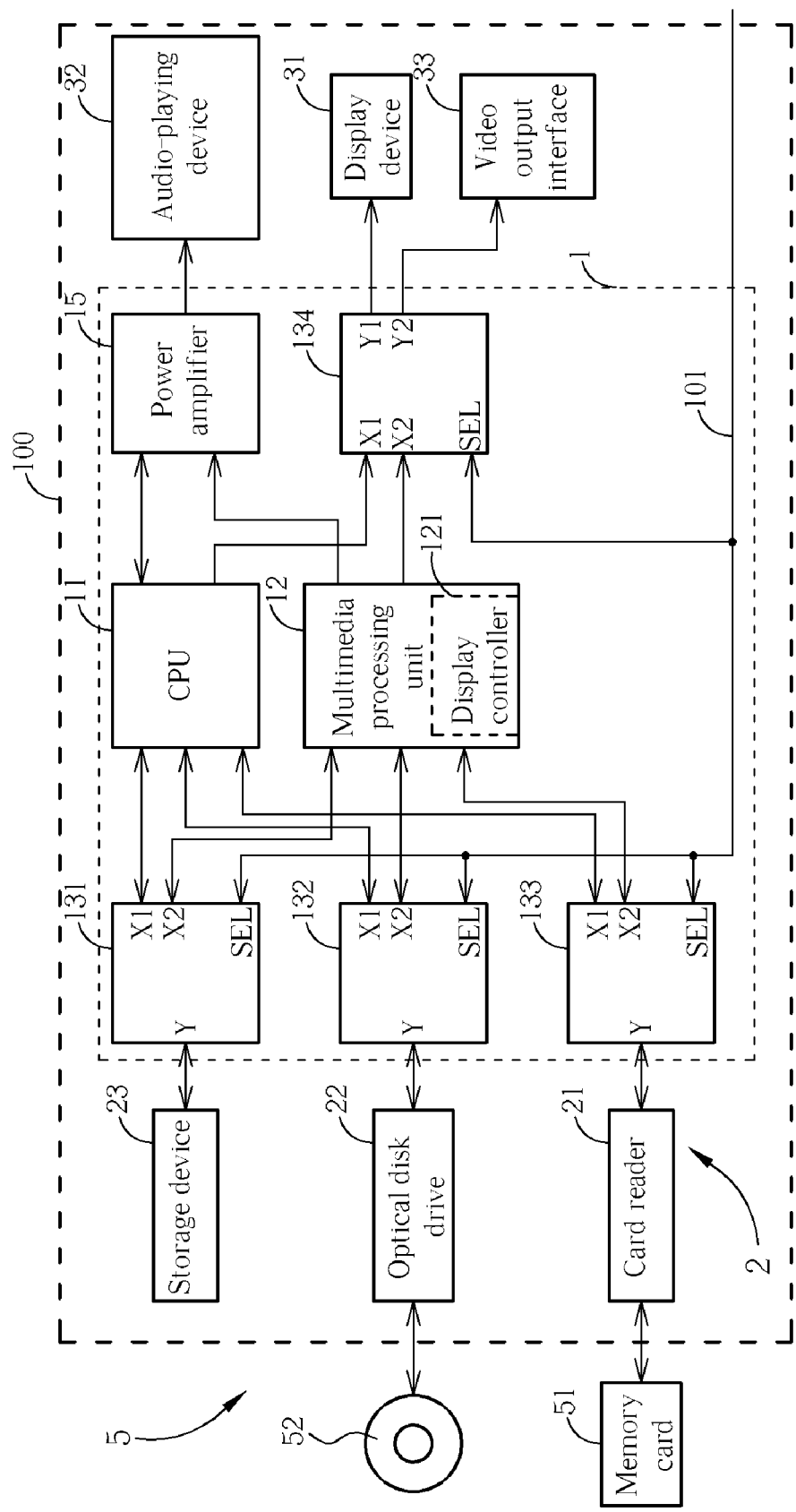
FIG. 2 is a block diagram of a multimedia computer system capable of outputting video based on the present invention.

FIG. 2 is a block diagram of a multimedia computer system 100 capable of outputting video based on the present invention. The computer system 100 is used for playing a multimedia source of a storage medium 5 (e.g. image, movie, or music data on a CD or DVD), and comprises a control module 1, an access device 2, a display device 31, an audio-playing device 32, and a video output interface 33.

In this embodiment, the access device 2 includes a card reader 21, an optical disk drive 22, and a storage device 23. The storage medium 5 accessed by the card reader 21 is a memory card 51, and the storage medium 5 accessed by the optical disk drive 22 is a video optical disk 52. The storage device 23 is a hard disk. As known in the art, the access device 2 can be a high-speed transmitting interface, such as a USB interface, and the storage medium 5 can be a portable storage device, such as a USB mass storage device.

The display device 31 of this embodiment is a liquid crystal display (LCD) embedded in the computer system 100. The audio-playing device 32 is a speaker; the video output interface 33 conforms to an LVDS format, an S-Video format, a CVBS format, or an RGB format for transmitting video signals to an external display device (not shown).

The control module 1 comprises a central processing unit 11, a multimedia processing unit 12, three input switch circuits 131~133, an output switch circuit 134, and a power amplifier 15.

The central processing unit 11 is electrically connected to the output switch circuit 134, and can control the output switch circuit 134 to output signals to the display device 31 or the video output interface 33.

The three input switch circuits 131~133, the output switch circuit 134, and the power amplifier 15 are electrically connected to the central processing unit 11 and the multimedia processing unit 12. The three input switch circuits 131~133 are respectively connected to the storage device 23, the optical disk drive 22, and the card reader 21. The output switch circuit 134 is electrically connected to the display device 31 and the video output interface 33. The power amplifier 15 electrically connected to the audio-playing device 32 is used for amplifying component audio signals of video signals, and then the audio-playing device 32 plays audio signals.

Note that the central processing unit 11 and the multimedia processing unit 12 have their own power sources. There are control buttons (not shown) set for different modes. When a control button is pressed, it supplies power correspondingly so as to select a computer mode or a multimedia mode for operation.

Additionally, the priority of the operation is set to the computer mode. Thus, when the computer system 100 is in the computer mode and the control button for the multimedia mode is pressed unexpectedly, it will not enter the multimedia mode. However, when in the multimedia mode and the control button for the computer mode is pressed unexpectedly, the computer system 100 will enter the computer mode.

Pressing the control button for the computer mode will boot the computer system 100. The central processing unit 11 can determine whether the storage medium 5 is inside the access device 2. If it is, the computer mode is entered to play video signals from the storage medium 5. Otherwise, when the control button for the multimedia mode is pressed, the computer system 100 enters the multimedia mode. The multimedia processing unit 12 can determine whether the storage medium 5 is inside the access device 2. If so, the multimedia mode is entered to play video signals from the storage medium 5.

The multimedia processing unit 12 comprises a display controller 121 electrically connected to the output switch circuit 134 for receiving video signals and scaling such signals formatted for the display device 31.

In this embodiment, the input/output switch circuits 131~134 include an integrated circuit (IC) or a plurality of MOSFET circuits. These switch circuits 131~134 receive a select signal 101 to set the operation mode accordingly. The select signal 101 is generated when a user presses external buttons (not shown) of the computer system 100 or operates a remote control. Another method is to use an on-screen display (OSD) function to show a list of functions on the display device 31 via the display controller 121, such that the select signal 101 is generated accordingly.

When the computer system 100 is powered on, the computer mode is entered to set the input/output switch circuits 131~134. That is, node X1 is connected to node Y in the input switch circuits 131~133 while node X1 is connected to node Y1 or to node Y2 in the output switch circuit 134. Therefore, all commands are sent and controlled by the central processing unit 11. When the computer system 100 is powered off, the user presses the button or operates the remote control to enter the multimedia mode. Then node X2 is connected to node Y in the input switch circuits 131~133 while node X2 is connected to node Y1 or to node Y2 in the output switch circuit 134. Therefore, when the computer system 100 is powered off, the multimedia processing unit 12 is capable of processing video signals and playing video.

No matter whether the computer system is powered on or off, the input switch circuits 131~133 can respectively access the storage device 23, the optical disk drive 22, and the card reader 21 because each input switch circuit is correspondingly connected to each access device.

The output switch circuit 134 includes inputs X1 and X2 respectively connected to the central processing unit 11 and the multimedia processing unit 12. Additionally, the output switch circuit 134 further includes outputs Y1 and Y2 respectively connected to the display device 31 and the video output interface 33 for outputting signals.

The output switch circuit 134 receives the video signals from the central processing unit 11 and the multimedia processing unit 12 via inputs X1 and X2, and then outputs the host signal or the multimedia signal. How the output switch circuit 134 determines to output signals through output Y1 or Y2 depends on the power sources of the central processing unit 11 and the multimedia processing unit 12. Then, video signals can be played directly by the display device 31, or played by an external display device via the video output interface 33.

In summary, before the host signal generated by the central processing unit 11 and the multimedia signal generated by the multimedia processing unit 12 are transmitted to the output switch circuit 134, all signals are transformed to the format for the display device 31 or for the video output interface 33. Therefore, the output switch circuit 134 just outputs signals to the display device 31 or to the video output interface 33 for playing. The present invention not only simplifies the design of the system, but also provides a function for outputting video signals via the video output interface 33.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system for playing a multimedia source of a storage medium, the computer system comprising:
   a display device;
   a video output interface for transmitting a video signal of the multimedia source to an external display device; and
   a control module electrically connected to the display device and the video output interface, the control module comprising:
   a single central processing unit receiving the video signal of the multimedia source and outputting a host signal formatted for the display device when the computer system is powered on and a computer mode is entered;
   a single multimedia processing unit transforming the video signal of the multimedia source to conform to the format for the display device when the central processing unit is powered off and a multimedia mode is entered, wherein the central processing unit and the multimedia processing unit each have a corresponding power source, the central processing unit is powered on and the multimedia processing unit is powered off when the computer system enters computer mode, and the central processing unit is powered off and the multimedia processing unit is powered on when the computer system enters multimedia mode; and
   an output switch circuit electrically connected to the central processing unit, the multimedia processing unit, and the display device, the output switch circuit comprising inputs X1 and X2 respectively coupled to the central processing unit and the multimedia processing unit, and outputs Y1 and Y2 respectively coupled to the display device and the video output interface;
   wherein the input X1 or X2 of the output switch circuit is selected to receive signals from the central processing unit or from the multimedia processing unit respectively, and the output Y1 or Y2 is selected to output video signals to the display device or to the video output interface respectively.

2. The computer system of claim 1 wherein the multimedia processing unit comprises a display controller electrically connected to the input X2 of the output switch circuit for receiving the video signal and scaling the video signal to conform to the format for the display device.

3. The computer system of claim 1 further comprising an access device for loading the video signal of the storage medium, the control module further comprising an input switch circuit electrically connected to the access device, the central processing unit, and the multimedia processing unit, wherein the multimedia processing unit determines whether the storage medium is connected to the access device when the central processing unit is powered off as a condition for the multimedia mode being entered for playing the video signal.

4. The computer system of claim 3 wherein the access device is a card reader, and the storage medium is a memory card.

5. The computer system of claim 3 wherein the access device is an optical disk drive, and the storage medium is a video optical disk.

6. The computer system of claim 3 wherein the input switch circuit comprises an integrated circuit or a plurality of metal-oxide semiconductor field-effect transistor (MOSFET) circuits.

7. The computer system of claim 1 wherein the output switch circuit comprises an integrated circuit or a plurality of metal-oxide semiconductor field-effect transistor (MOSFET) circuits.

* * * * *

UNITED STATES PATENT AND TRADEMARK OFFICE
CERTIFICATE OF CORRECTION

| | | |
|---|---|---|
| PATENT NO. | : 7,500,022 B2 | Page 1 of 1 |
| APPLICATION NO. | : 11/160517 | |
| DATED | : March 3, 2009 | |
| INVENTOR(S) | : Chun-Chang Yang et al. | |

It is certified that error appears in the above-identified patent and that said Letters Patent is hereby corrected as shown below:

On the title page, item (54), and col. 1, correct the title of Invention to read as follows:
COMPUTER SYSTEM WITH BUILT-IN MULTIMEDIA SYSTEM WHERE MULTIMEDIA SYSTEM IS OPERABLE INDEPENDENT OF THE OPERATING SYSTEM OF THE COMPUTER SYSTEM AND WHERE COMPUTER SYSTEM IS CAPABLE OF OUTPUTTING VIDEO SIGNALS TO AN EXTERNAL DISPLAY DEVICE On the title page, item (73), correct the name of the assignee from "Mirco-Star Int'l Co., Ltd." to "Micro-Star Int'l Co., Ltd."

Signed and Sealed this

Fifth Day of May, 2009

JOHN DOLL
*Acting Director of the United States Patent and Trademark Office*